Oct. 30, 1951 — F. R. CHESTER — 2,573,246
COFFEE FILTER
Filed April 26, 1947
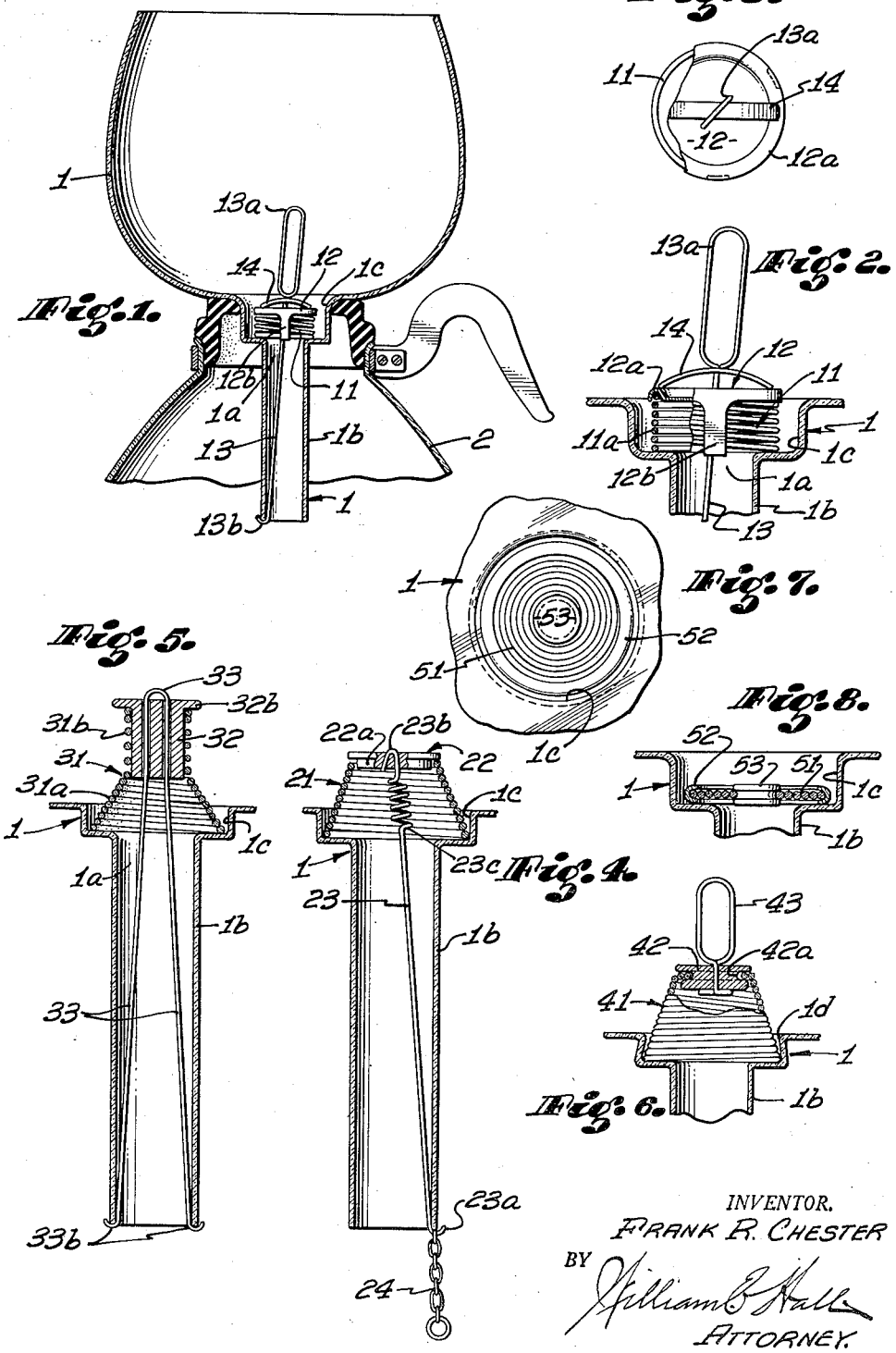
INVENTOR.
FRANK R. CHESTER
BY
William B Hall
ATTORNEY.

Patented Oct. 30, 1951

2,573,246

UNITED STATES PATENT OFFICE 2,573,246

COFFEE FILTER

Frank R. Chester, Santa Monica, Calif.

Application April 26, 1947, Serial No. 744,134

2 Claims. (Cl. 210—162)

My present invention relates to filters or strainers, and specifically to a filter or strainer which is adapted particularly for use in straining fluids from containers, such as from upper coffee containers in coffee makers.

One of the principal objects of this invention is to provide a strainer of this class which is so constructed that it may be easily inserted or placed into the bottom of the container from which fluid is to be strained, and which also may be easily removed therefrom.

Another important object of this invention is to provide a strainer of this class which may be easily dismantled, cleaned, and again readily assembled for use.

An important object also of this invention is to provide a strainer of this class, the parts of which will not readily deteriorate or get out of order, and one in which the parts may be readily replaced when desired.

A further important object of this invention is to provide a strainer formed from spring-like convolutions, and which is resiliently held in place over the straining opening of the receptacle for which it is provided.

Still another important object of this invention is to provide a device of this class in which the straining coil and retaining spring therefor are formed from a single element.

An important object of this invention also is to provide a device of this class which is simple and economical to produce.

With these and other objects in view, as will appear hereinafter, I have devised a strainer having certain novel features of construction, combination, and arrangement of parts and portions, as will be hereinafter described in detail and particularly set forth in the appended claims, reference being had to the accompanying drawings and to the characters of reference thereon, which form a part of this application, in which:

Fig. 1 is a partial side and partial elevational view of my strainer in one form, and showing the same applied to the upper receptacle of a coffee maker for straining the coffee from the upper to the lower receptacles thereof;

Fig. 2 is an enlarged fragmentary side elevational view of the strainer of Fig. 1, showing the same partly in section;

Fig. 3 is a plan view thereof, taken at 3—3 of Fig. 2, showing certain portions broken away and in section to facilitate the illustration;

Fig. 4 is a partial side and partial elevational view of my strainer in a modified form of construction, and also showing the same seated in the bottom of a fragmentary portion of the upper receptacle of the coffee maker;

Fig. 5 is a sectional elevational view of my strainer in still another modified form of construction;

Fig. 6 is a partial sectional and partial elevational view of my strainer in another modified form, and showing the same seated in a fragmentary portion of the upper receptacle of a coffee maker;

Fig. 7 is a top view of still another modification of my strainer of flat construction; and, Fig. 8 is a sectional elevational view thereof, taken through 7—7 of Fig. 6, showing the same located in the well of a receptacle.

In all of the views of the drawings, the strainer element is made from a wire coil, and, in all except one of the views, it is generally of helix-like shape. All of the strainers shown are constructed so that they may be readily placed over the discharge opening $1^a$ of a receptacle $1$ for straining the coffee in the upper receptacle into the lower receptacle $2$ of such coffee maker. In the drawings, and particularly Fig. 1, the receptacle $1$ has a downwardly extending spout $1^b$, as in the conventional coffee maker of this type, and the strainer is seated within a well $1^c$ in the bottom of the receptacle and around the discharge opening $1^a$, that is, the discharge opening is provided in the bottom of the well $1^c$.

Although my strainer is shown in connection with a coffee maker, and is designed for straining coffee from the upper to the lower portion thereof, I wish it understood that my invention is not confined to coffee makers, nor to such use.

The straining element shown in Figs. 1, 2, and 3, consists of a helix $11$ which is open-wound, that is, the convolutions $11^a$ are coaxial, and normally are axially spaced so as to provide a considerable helical opening between the convolutions. The bottom open end of the strainer element is seated within the well $1^c$ and over the discharge opening $1^a$.

Over the upper end of the straining element is loosely located a cap $12$, this cap forming a cover for the upper open end of the straining element. This cap has an annular channel $12^a$ at the peripheral portion of the under side, which receives the upper convolution of the straining element and thereby locates the cap.

The straining element is securely located in the position mentioned by a retaining member $13$ in the form of a tension rod, which extends axially through the cap and the straining element. The upper end of the retaining member has a looped handle 13ª, and the lower end is provided with a hook 13ᵇ. The shank portion of the retaining member 13 extends through the central portion of a leaf spring 14, the central portion of the spring engaging the under side of the loop or handle portion 13ª, and the ends of the spring engaging the upper side of the cap at the peripheral portion. In this manner, the retaining member is urged in an upper position. The straining element is retained in position by extending the hook portion 13ᵇ under the edge at the lower end of the spout 1ᵇ, the spring 14 holding the member 13 in such position.

The peripheral portion of the cap 12 has downwardly extending legs 12ᵇ, which are forced downwardly against the bottom of the well by means of the spring 14, and the legs 12ᵇ limit the compression of the helical straining element and the closing of the space between the convolutions thereof.

In the modified structure of my strainer, shown in Fig. 4, the straining element, designated 21, is of helix-like form, though of frusto-conical shape. In this structure, the diameter at the lower end of the strainer is made such that the lower convolutions are caused slightly to contact when forced into the well 1ᶜ, and resiliently engage the walls of the well for retaining the straining element in position.

On the upper end of the straining element is provided a cap 22 having a portion 22ª which extends into the upper end of the straining element for locating the cap. A retaining member 23 extends through the straining element and is secured at its upper end to the cap, and is provided at its lower end with a hook portion 23ª which engages the edge at the lower end of the spout. The securing of the upper end of the retaining member to the cap may be by means of a loop portion 23ᵇ. The retaining member is provided intermediate its ends with a spring 23ᶜ which causes a yieldable contraction between the ends of the retaining member. The hook 23ª may be drawn below the lower end of the spout 1ᵇ by a chain 24 to facilitate the drawing of the hook downwardly.

The helix-like element 21 may be either open or close-wound. If open-wound, the convolutions are forced together by means of the retaining or tension member 23. If so wound, the force-requiring contraction of the convolutions of the straining element is less than the tension of the spring portion 23ᶜ.

In the modified structure shown in Fig. 5, the straining element 31 consists of a lower close-wound frusto-conical coil 31ª and an upper open-wound cylindrical portion 31ᵇ extending upwardly from the portion 31ª. The lower end of the portion 31ª may be seated similarly, and within the portion 31ᵇ is a cap in the form of a plug 32, the upper end of the plug having a flange 32ᵇ to limit the seating of the plug within the straining element. Through the plug is extended a retaining member 33. This retaining member is substantially of U-shaped construction and the legs 33ª thereof are extended downwardly through the plug, the lower ends of the legs extending considerably below the straining element. The lower ends of the legs 33ª have hooks 33ᵇ which are adapted to engage the edges at the lower end of the spout 1ᵇ, above referred to.

When the retaining member 33 is forced into position with its hooks under the edge of the spout, this retaining member is resiliently held in position by reason of the spring action afforded by the open-wound portion 31ᵇ.

In the modified structure shown in Fig. 6, the straining element, designated 41, is constructed similarly to the one shown in Fig. 4 and is of necessity close-wound. It is held in position by forcing the larger diameter portion of the lower end of the straining element into a well 1ᵈ, having preferably a constricted upper end or neck, and resiliently holding the straining element against the walls of the well by a slight contraction of the bottom convolution of the straining element. In the upper end of the straining element is secured a cap 42. This cap may be held in position by causing the upper convolutions of the straining element to enter an annular groove 42ª in the peripheral portion of the cap. This straining element may be handled by providing a wire-looped handle 43 at the central portion of the cap.

The strainer, designated 51 and shown in Figs. 7 and 8, is flat and formed in the shape of an Archimedes spiral with the convolutions tightly wound against each other. The strainer is encased in a hollow rim 52, binding the coil from unwinding or against being distorted. At the center of the strainer is a plug or cap 53 for closing the center to simplify the binding of the coil.

In all instances of close winding of the straining element, such as referred to in connection with Figs. 4, 5, 6, 7 and 8, ordinarily sufficient space is provided with the adjacent convolutions to permit coffee, or other liquid, to seep through. However, slight or small openings may be positively provided between the adjacent convolutions by roughening the convolutions of the straining element. Such roughening may be created by sand blasting the same. This roughening may be of various degrees to vary the size of the openings or separation between the adjacent convolutions.

I wish it to be understood that I do not desire to be limited to the exact details of construction shown and described, for obvious modifications will occur to a person skilled in the art.

I claim:

1. In a device of the class described, a support having an opening, an open-wound compressible helix-like strainer adapted to be supported at one end on the support over the opening, a cover disc seated on one end of the strainer and provided at its periphery with legs extending along the outside of the strainer for limiting the axial compression of the strainer, a retaining member having a handle at one end and extending with its other end axially through the cover and strainer and provided at the latter end with a means for engaging the support through the opening, and a spring between the cover and the handle of the retaining member.

2. In a device of the class described, a support having an opening, an open-wound compressible helix-like strainer adapted to be supported at one end on the support over the opening, a cover disc seated on the other end of the strainer and provided at its periphery with legs extending along the outside of the strainer for limiting the axial compression of the strainer with respect to said support, and, a retaining tension member resiliently connected at one end to the cover and provided at its opposite end with a retaining means for engaging the support through the opening.

FRANK R. CHESTER.

(References on following page)

REFERENCES CITED

The following references are of record in the file of this patent:

UNITED STATES PATENTS

| Number | Name | Date |
|---|---|---|
| 991,215 | Kuhajda | May 2, 1911 |
| 1,150,910 | Warmington | Aug. 24, 1915 |
| 2,068,282 | Strindberg | Jan. 19, 1937 |
| 2,100,266 | Perry | Nov. 23, 1937 |
| 2,190,965 | Wood | Feb. 20, 1940 |
| 2,197,971 | Elze et al. | Apr. 23, 1940 |
| 2,225,027 | Anders | Dec. 17, 1940 |
| 2,269,956 | Renner | Jan. 13, 1942 |
| 2,381,104 | Burnham | Aug. 7, 1945 |
| 2,429,417 | Magill | Oct. 21, 1947 |